(12) United States Patent
Denisenko et al.

(10) Patent No.: US 11,480,045 B2
(45) Date of Patent: Oct. 25, 2022

(54) METHODS FOR ASSISTED AND AUTOMATED HORIZONTAL WELL GEOSTEERING

(71) Applicant: RNA Capital Inc., Houston, TX (US)

(72) Inventors: Ivan Denisenko, Moscow (RU); Oleg Kushmantsev, Ulianovsk (RU); Igor Uvarov, Houston, TX (US); Igor Kuvaev, Houston, TX (US)

(73) Assignee: RNA Capital Inc., Houston, TX (US)

( * ) Notice: Subject to any disclaimer, the term of this patent is extended or adjusted under 35 U.S.C. 154(b) by 0 days.

(21) Appl. No.: 16/862,404

(22) Filed: Apr. 29, 2020

(65) Prior Publication Data

US 2020/0340350 A1 Oct. 29, 2020

Related U.S. Application Data

(60) Provisional application No. 62/840,232, filed on Apr. 29, 2019.

(51) Int. Cl.
*E21B 44/00* (2006.01)
*G06F 17/17* (2006.01)
*E21B 45/00* (2006.01)
*E21B 49/00* (2006.01)
*E21B 7/04* (2006.01)

(52) U.S. Cl.
CPC .............. *E21B 44/00* (2013.01); *E21B 7/046* (2013.01); *E21B 45/00* (2013.01); *E21B 49/00* (2013.01); *G06F 17/17* (2013.01)

(58) Field of Classification Search
CPC .......... E21B 44/00; E21B 7/046; E21B 45/00; E21B 7/04; G06F 17/17
See application file for complete search history.

(56) References Cited

U.S. PATENT DOCUMENTS

| 8,793,111 | B2 * | 7/2014 | Tilke | E21B 43/00 703/10 |
|---|---|---|---|---|
| 9,378,419 | B2 * | 6/2016 | Simske | G06K 9/00536 |
| 10,168,447 | B2 * | 1/2019 | Priezzhev | E21B 44/00 |
| 11,162,349 | B2 * | 11/2021 | Flanagan | E21B 44/00 |
| 2016/0076357 | A1 * | 3/2016 | Hbaieb | E21B 44/00 702/9 |
| 2016/0341834 | A1 * | 11/2016 | Bartetzko | G01V 1/50 |
| 2022/0127951 | A1 * | 4/2022 | Sun | E21B 7/06 |

* cited by examiner

*Primary Examiner* — Jonathan Malikasim

(57) ABSTRACT

A method of automated or assisted geosteering for drilling of a horizontal well compromises automated or assisted estimation of a well's position in a target geological formation using the data acquired during the drilling process.

23 Claims, 10 Drawing Sheets

METHODS FOR ASSISTED AND AUTOMATED HORIZONTAL WELL GEOSTEERING

RELATED APPLICATIONS

This application claims priority to U.S. Provisional Application No. 62/840,232, filed Apr. 29, 2019.

BACKGROUND OF THE INVENTION

The invention relates to the field of horizontal well geosteering. More particularly the invention relates to automated or assisted geosteering.

Oil and gas bearing rocks are often present in layered formations. In the past, mostly vertical wells were drilled to produce hydrocarbons from these formations. However, the industry switched to horizontal well drilling as horizontal wells that go along the productive formation can result in better production performance.

Geosteering is the act of adjusting the borehole position (e.g., inclination and azimuth angles of drillbit) during the drilling process to reach one or more geological targets. These changes may be based on geological information gathered before or while drilling. Geosteering may include the process of drilling a horizontal well. Further, geological formations are not always horizontal, but can have bends such as various formation dips and can have faults (disruptions).

SUMMARY OF EXAMPLE EMBODIMENTS

The embodiments of the invention relate to methods and systems of assisted and automated horizontal well geosteering. Examples can include a geosteering system can comprising machine learning algorithm for correlating vertical deviated and horizontal wells, a general algorithm for automated geosteering, big segment analysis method for assisted and automated geosteering, repeated section method for assisted and automated geosteering, self-correlation method for assisted and automated geosteering, assisted and automated geosteering confidence factor, geosteering spectrum, real-time implementation of automated and assisted geosteering, and using drilling data for assisted and automated geosteering.

An example embodiment may include a method for geosteering a drill bit comprising acquiring log data from at least one typewell, normalizing data from the at least one well log for a lateral well, identifying a plurality of big segments within the horizontal section of the wellbore, comparing measured data with normalized data within each big segment from the at least one typewell and determining the K-values of a plurality of algorithms, wherein the algorithm generating the largest K-value is selected, drilling through a plurality of geological formations within the horizontal section of the wellbore, determining the geological formation the wellbore passes through using the comparison of the measured data with the normalized data, and adjusting the path of the drill bit to a desired geological formation.

A variation of the example embodiment may include selecting big segments that overlap. It may include comparing measured data with normalized data from the at least one typewell and determining the K-values of a plurality of algorithms within the plurality of big segments, wherein the algorithm generating the best K-value is selected. It may include determining the geological formations the wellbore passes through within the plurality of big segments using the comparison of the measured data with the normalized data of overlapping big segments. It may include sending commands from the surface to the drill bit to adjust the path of the wellbore. Comparing of the measured data with the normalized data may include mean square deviation calculations, Pearson correlation coefficient calculations, cumulative absolute value difference calculations, cumulative difference depending on amplitude calculations, or cumulative difference depending on amplitude calculations. The at least one typewell may be a plurality of vertical typewells or plurality of typewells in general. It may include selecting a user defined dip range within the plurality of big segments. It may include selecting a first basic comparison algorithm. The selected best algorithm among all available algorithms may be the one that is calculated to have the highest similarity function output in the plurality of big segments. It may include calculating the K-Value for a plurality of big segments. It may include using the interpretation with the best K-value for the plurality of big segments. It may include incorporating drilling data in realtime to update geosteering interpretation. The drilling data may include rate of penetration data or mechanic specific energy data. It may include generating a geosteering spectrum, wherein the highest values of a combined similarity function are displayed.

An example embodiment may include a method for geosteering in a well comprising acquiring log data from at least one vertical typewell, determining from measured log data if the well portion the drill bit is currently located in is vertical or a deviated portion of a lateral well, comparing a forward looking algorithm on a predetermined first big segment encompassing the drill bit's location in the well and find a correlation with the typewell log data with the largest K-value, comparing a forward looking algorithm on a consequent big segment, adjacent to the first big segment, encompassing the drill bit's location in the well and find a correlation with the typewell log data with the largest K-value, determining the location of the drill bit using the largest K-value correlation.

A variation of the example embodiment may include performing a big segment analysis on the whole well. It may include determining the best algorithm to characterize the whole well based on the largest K-value. It may include generating a target line for the drillbit to follow. It may include generating one or more well plan change recommendations based on the drillbit location information. It may include acquiring additional well log data and updating the correlation analysis. Comparing of the measured data with the typewell data may include mean square deviation calculations, Pearson correlation coefficient calculations, cumulative absolute value difference calculations, cumulative difference depending on amplitude calculations, or cumulative difference depending on amplitude calculations. It may include incorporating drilling data in realtime to update geosteering interpretation. The drilling data may include rate of penetration data or mechanic specific energy data. It may include generating a geosteering spectrum, wherein the highest values of a combined similarity function are displayed.

An example embodiment may include a method comprising identifying locations where a wellbore character is undergoing change, the wellbore character associated with a wellbore trajectory for a wellbore, splitting the wellbore trajectory into segments based on the identified locations, identifying a log segment pattern based on a deviation of log segment values from an average log value associated with a log segment, identifying geological layers through which the wellbore is crossing based a degree of the deviation, and generating a geosteering plan based on the identified geological layers.

A variation of the example embodiment may include identifying additional geological layers based on additional deviations from an additional average log value associated with a second log segment, wherein the geosteering plan is further based on the additional geological layers. Calculating the deviation of a log segment values from an average log value pattern may include mean square deviation calculations, Pearson correlation coefficient calculations, cumulative absolute value difference calculations, cumulative difference depending on amplitude calculations, or cumulative difference depending on amplitude calculations. It may include incorporating drilling data in realtime to update geosteering interpretation. The drilling data may include rate of penetration data or mechanic specific energy data. It may include generating a geosteering spectrum, wherein the highest values of a combined similarity function are displayed. It may include steering a drill bit based on a desired target line generated by the geosteering plan. It may include measuring log data while drilling and updating the geosteering plan. It may include measuring drilling data while drilling and updating the geosteering plan. It may include measuring log data while drilling and updating the geosteering plan in realtime. It may include measuring drilling data while drilling and updating the geosteering plan in realtime.

An example embodiment may include a method comprising selecting a wellbore segment, logging wellbore environment information of the selected wellbore segment, determining levels of similarity between the logged wellbore environment information and a plurality of synthetic logs information, identifying an optimal synthetic log based on the levels of similarity, wherein the optimal synthetic log is most similar to the logged wellbore environment information, and directing a drill bit in a wellbore based on a model associated with the optimal synthetic log.

A variation of the example embodiment may include the determining levels of similarity between the logged wellbore environment information and a plurality of synthetic logs information includes a mean square deviation calculation, a Pearson correlation coefficient calculation, a cumulative absolute value difference calculation, a cumulative difference depending on amplitude calculation, or a cumulative difference depending on amplitude calculation. It may include measuring log data while drilling and updating the logged wellbore environment information. It may include incorporating drilling data in realtime to update geosteering interpretation. The drilling data may include rate of penetration data. The drilling data may include mechanic specific energy data. It may include generating a geosteering spectrum, wherein the highest values of a combined similarity function are displayed.

An example embodiment may include a method for geosteering a portion of a well comprising storing data from an original well log in a computer, creating a distorted log to the original by adding noise and depth distortion to the original log, training neural network based on the original log and the distorted log, correlating the vertical and deviated portion of a horizontal well log with a typewell log using the trained neural network, and geosteering based on the correlation. The correlating may include determining the Euclidian distance between two points in n-dimensions of space and recognizing a correlation when the Euclidian distance is within a desired value. The correlating may include determining geological formations tops. The correlating may be performed in real time.

BRIEF DESCRIPTION OF THE DRAWINGS

For a thorough understanding of the present invention, reference is made to the following detailed description of the preferred embodiments, taken in conjunction with the accompanying drawings in which reference numbers designate like or similar elements throughout the several figures of the drawing. Briefly.

DETAILED DESCRIPTION OF EXAMPLES OF THE INVENTION

In the following description, certain terms have been used for brevity, clarity, and examples. No unnecessary limitations are to be implied therefrom and such terms are used for descriptive purposes only and are intended to be broadly construed. The different apparatus, systems and method steps described herein may be used alone or in combination with other apparatus, systems and method steps. It is to be expected that various equivalents, alternatives, and modifications are possible within the scope of the appended claims.

Geosteering may be conducted manually with the help of geosteering software that processes the data and helps the geologist to understand the wellbore's position in relation to the oil/gas reservoir and adjust wellbore's position.

Automated or assisted geosteering may allow for the geologist to geosteer multiple wellbores at the same time. The technology can perform geosteering interpretation autonomously or under supervision of the geologist.

Geosteering data may be interpreted is to come up with a stratigraphic position for the horizontal or deviated well that is being drilled now or was drilled before. During the geosteering interpretation, the horizontal well may be split into certain number of segments and the formation dip for each of these segments can be calculated. The formation dip may be interpreted while matching one or more well logs, acquired while drilling, with a historical log of a vertical or deviated well that has been drilled nearby.

Automated geosteering or well correlation of the vertical and deviated wells can be conducted using machine learning algorithm.

Automated interpretation of the horizontal well can be carried out with two methods: big segment analysis, and geosteering based on the geosteering spectrum.

A machine learning algorithm can be used to correlate vertical or deviated section of the well with the typewell or to correlate vertical wells with each other and to set formation tops. A formation top, such as the pronounced change in log data shown on FIG. 1 at a depth of 860 allows the top of the formation to be identified. The neural network approach involves the neural network model being trained to compare different well log intervals. The neural network model may be created (trained) using 3 log pieces—original log, log similar to original and log different from original. The log similar to original that is used for the training may be created synthetically by adding noise and depth distortion to the original log data to imitate nearby deviated or vertical well behavior.

The trained neural network model returns n values (point in n-dimension space) for every input log. The similarity of 2 logs is estimated as a Euclidian distance between 2 points in n-dimension space. If the Euclidian distance is small then it means that 2 curves are similar to each other.

Figure 1:
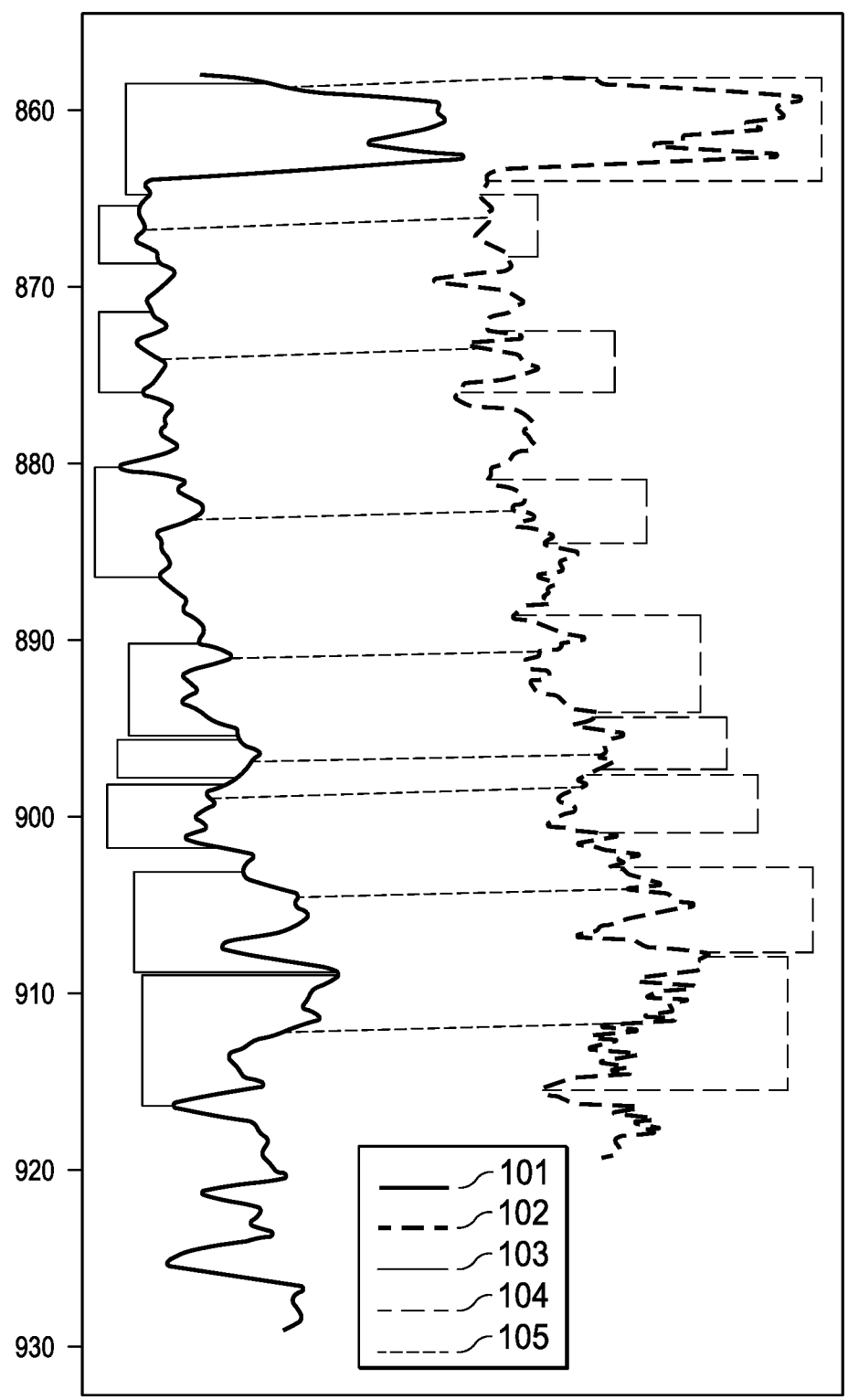
FIG. 1 shows a Machine learning algorithm for correlating vertical deviated and horizontal wells.

A sample workflow of correlating vertical or deviated section of the well with the typewell or to correlating vertical wells with each other is presented in FIG. 1. The sample workflow includes:

1) Selecting an interval on well 1 (101), 400-600' in length (103). The trained neural network (NN) model takes the data 101 and outputs points in n-dimensional space.

2) With sliding window (different MID ranges) calculate same point in n-dimensional space for well 2 (102), the intervals are displayed as (104).

3) Calculate similarity and pick the value with lowest Euclidian distance. This will identify the same geological formations on both wells (105).

Selected log segments can be filtered and averaged. Also, different segment lengths can be selected to come up with better similarity result.

Figure 2:
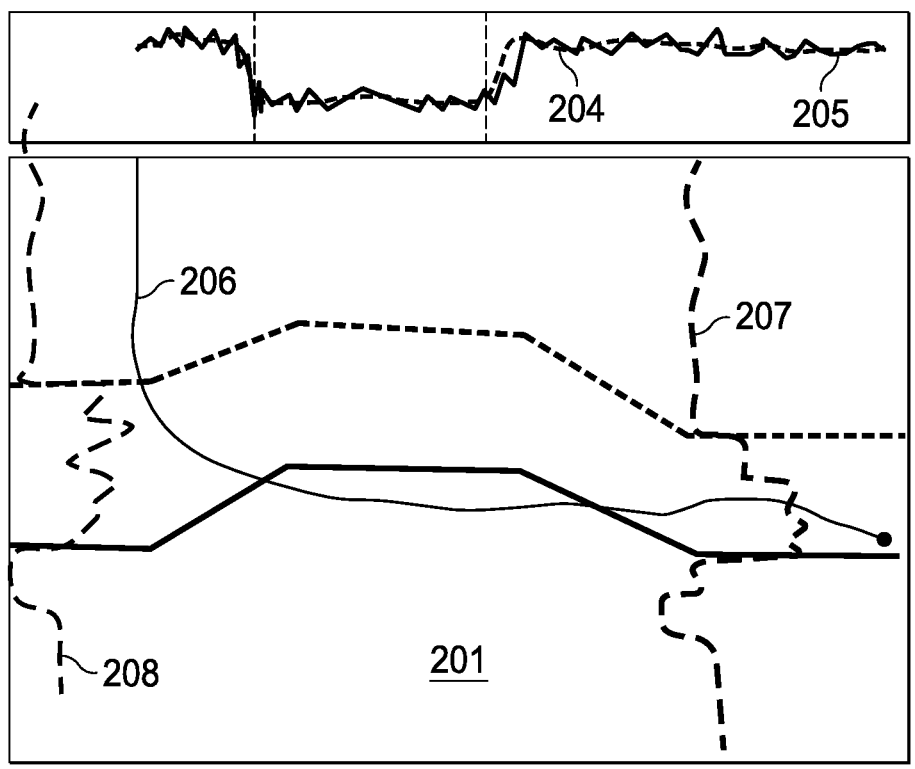
FIG. 2 shows a big segment analysis method for Assisted and Automated geosteering.
Figure 2:
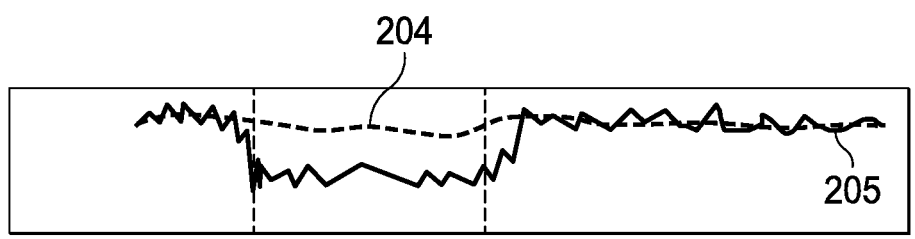
Figure 2:
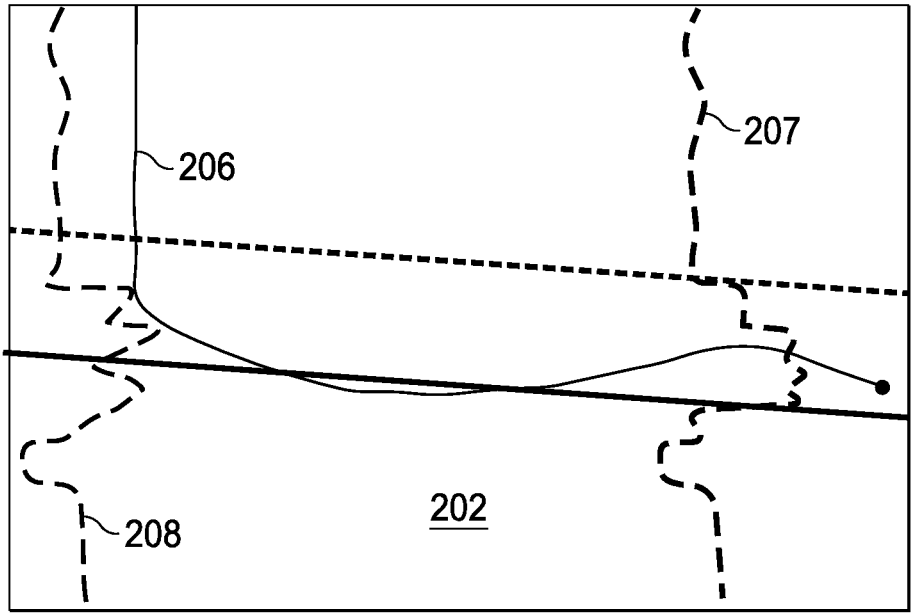

The automated geosteering interpretation can be carried iteratively by changing various formation parameters and comparing the resulting synthetic log with the actual log. As shown in FIG. 2 the process of finding the appropriate formation parameters using the horizontal well log (205) from the horizontal well (206) and synthetic log (204) is calculated from one or more typewells (207 or 208). The synthetic log is the log calculated from a typewell or multiple typewells for every segment using a certain thickness, formation dip, taking into account variable formation thickness from typewells or any other sources such as structure maps. Synthetic log calculation may also take into account variable properties from 2 or more typewells, so the resulting synthetic curve may be constrained to multiple typewells.

Automated geosteering interpretation can be also carried out by comparing multiple horizontal logs with multiple logs from a typewell or multiple typewells. In that case multiple synthetic logs will be created for each vertical well log. The resulting geosteering interpretation should provide the solution that has the best match with all logs.

An example algorithm for automated geosteering is an iterative process where the algorithm tests multiple formation dips, multiple typewells, multiple variable formation thickness options (formation parameters) to find which option corresponds to the extremum of a function that calculates the similarity of the horizontal well log (205) to the synthetic log (204). FIG. 2 shows two cases—(202) where the formation dip doesn't result in a good match between horizontal and synthetic logs and (201)—where the match is good.

A number of constraints may be provided as an input to the algorithm. It could be formation thickness, formation dip constraints or a list of nearby typewells that may be used.

The similarity function is the function that calculates the similarity of the horizontal well log (205) with the synthetic log (204). It could be calculated using, for example and without imputing limitation, mean square deviation, Pearson correlation coefficient, cumulative absolute value difference, the cumulative difference depending on amplitude, or any other function or a combination of these functions with different weights.

An example big segment analysis can provide automatic and assisted geosteering outcome and automatically select various calculation parameters depending on different well log behavior, well trajectory and additional geological constraints. Using these parameters the algorithm may automatically conduct geosteering using horizontal well log data by estimating a relative position of a drillbit relative to a geological formation as shown in FIG. 3.

Figure 3:
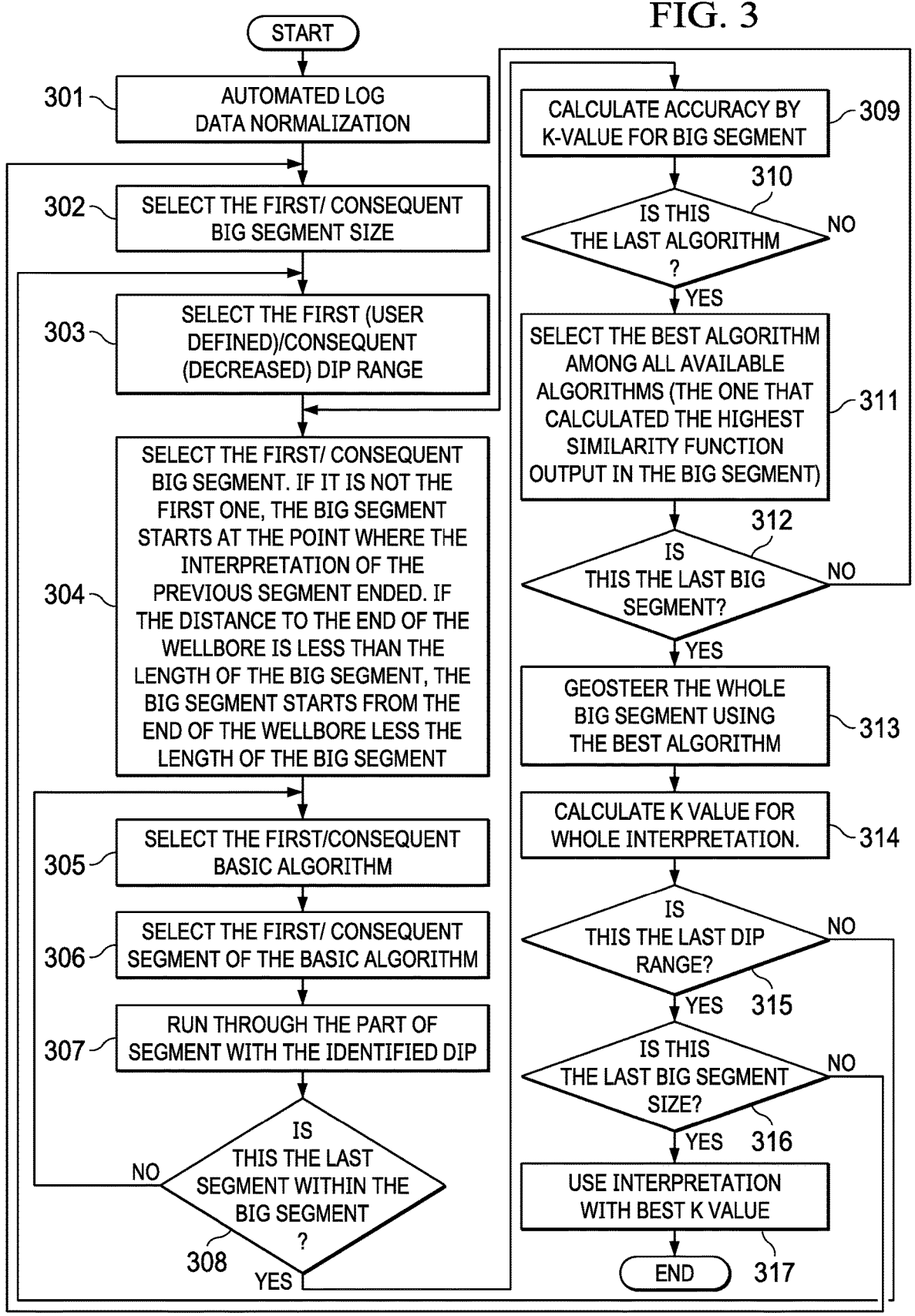
FIG. 3 shows an example algorithm for automated geosteering.

An example big segment analysis method is shown on FIG. 3. The big segment analysis algorithm may conduct automated geosteering for a big segment using the set of basic autogeosteering algorithms. Similarity functions between the synthetic log and horizontal log may be calculated for each resulting geosteering interpretation within the big segment using, for example, the following formula:

$$K = \frac{T^{pow1} \times SC^{pow5}}{(SQ^{pow2} \times (\sum \Delta\alpha)^{pow3} \times (\sum \Delta\beta)^{pow3} \times (\sum \Delta\gamma)^{pow4})}$$

Where:

T—Pearson correlation coefficient between the synthetic log and horizontal log. If T<=0, then T=some small value, for example 0.001.

pow1—weight of Pearson correlation coefficient.

SQ—mean square root deviation between the synthetic log and horizontal log.

pow2—weight of root mean square deviation.

$\Sigma\Delta\alpha$—sum dips differences between the neighboring segments.

$\Sigma\Delta\beta$—sum of dips differences between the segment and the regional dip.

pow3—weight of sum dips differences between the neighboring segments. The bigger the weight the similarity function for the interpretations with high formation dip difference between the segments. Smooth geosteering interpretations and interpretations matching the regional dip get a higher score.

$\Sigma\Delta\gamma$—Repeated section basic autogeosteering algorithm big segment confidence factor calculation result.

pow4—Weight of repeated section algorithm.

SC—Self-correlation basic autogeosteering algorithm big segment confidence factor calculation result.

pow5—Weight of self-correlation algorithm.

The big segment analysis method may pick the algorithm that resulted in a maximized K value using best basic algorithm selection workflow depicted in FIG. 3. Then a part of the big segment can be geosteered with the algorithm that was used to come up with an optimized solution. The part could vary from 10% to 60% of the big segment. After the interpretation is conducted the process is repeated from the last point where the geosteering stopped at the previous step.

The pow1, pow2, pow3, pow4, pow5 coefficients are defined as a result of multiple experimental runs where big segment method results are compared with human made geosteering interpretations. The resulting coefficients provide the best match between big segment method and human interpretation.

If the distance to the end of the wellbore is close or equal to the big segment size, then interpretation of the big segment can start from the point that is located one big segment away from the end of the well.

It may be possible to repeat big segment analysis run on the same well with different segment lengths and formation dip ranges. Each resulting interpretation is then compared to each other using similarity function from big segment analysis and the resulting interpretation with the highest K value is selected.

The geosteering interpretation obtained as a result of the big segment analysis can provide an optimal match between the synthetic log generated based on the log from the typewell and the horizontal well log. At the same time the resulting solution will be aligned with the initial geological information: regional dip, max dip difference from the regional dip, variability of the formation dip along the wellbore.

An example embodiment of the big segment analysis is disclosed in FIG. 3 and starts with an automated log and data normalization (301). A first or consequent big size segment is then selected (302). A first user defined consequent dip range is selected (303. A first or consequent big segment is selected (304), if it is not the first one, the big segment starts at the point where the interpretation of the previous segment ended. If the distance to the end of the wellbore is less than the length of the current big segment, the big segment starts from the end of the wellbore less the length of the current big segment. A first or consequent basic algorithm is selected (305). A first or consequent segment of the basic algorithm is selected (306). A run though the part of the segment with an identified dip is performed (307). At (308), if the last segment is not within the big segment selected then the analysis returns to (305), if the last segment is within the big segment then the analysis continues to calculate the accuracy by K-value for the big segment (309). If this is the last algorithm of the plurality of algorithms being analyzed at (310) then the big segment analysis continues to (311) to select the best algorithm among all available algorithms (the one that calculated the highest similarity function output in the big segment). If this is not the last big segment than the analysis at (312) returns to (304) for the next consequent big segment. Otherwise the analysis continues to geosteer the whole big segment using the best algorithm (313). The K-value for the whole interpretation is calculated at (314). Then if this is not the last dip range at (315), the analysis returns to select the next consequent dip range at (303). Otherwise the analysis continues to determine if this is the last big segment size (316). If it is not the last big segment size than the analysis returns to (302) for the next consequent big segment size. Otherwise, the analysis will use the interpretation with the best K-value (317).

Big segment analysis can be used to combine results obtained from basic geosteering algorithms and output the best results that provide the most accurate geosteering interpretation.

Big segment analysis consists of automated log data normalization, looking forward algorithm, a number of basic autogeosteering algorithms and a similarity function that allows to pick the best algorithm.

Log data can be automatically or manually normalized. The normalization process consists of matching the log scale between the typewell and other typewell or horizontal well. The resulting normalized logs have consistent log scale.

In some cases, the above algorithm may find a wrong dip that corresponds to the local extremum value. At the same time, there may be some other dip or multiple dips that matches the true geological dip. It may not correspond with the extremum of the whole range of searched dips, but with the local value of a respective similarity function. An additional run can be added to compensate for such cases. In the additional run, local extremums of the similarity function can be searched. Whenever a dip matches the local extremum, the next segment can be added for which the best possible dip may be searched. Additionally, an angle difference between the dip identified in the previous iteration (e.g., in case of the first segment, this may be a regional dip) and the chosen dip can be calculated. In the dip range for the first segment an optimal dip is chosen while maximizing KF value in the following formula:

$$KF = \frac{V1 \times V2}{\Delta a^{pow3}}$$

V1 and V2 are local extremums of similarity function, Act is the difference in dips between the current and previous segments, pow3 is the influence of the difference in dips between the previous and the current segment (penalty) on decision making. In case of a high penalty, a segment dip can be chosen which corresponds with the local extremum of the angle which is as near as possible to the dip of the previous segment.

Automated or assisted geosteering can be conducted using different sets of algorithms. They may have different segment lengths, use different similarity functions, and also differ as to whether the above looking forward and/or steering algorithms are used.

All basic autogeosteering algorithms can be used as a components of big segment analysis. They can also be used to come up with autogeosteering of one segment or to calculate the confidence factor or similarity function for a segment, big segment or a whole well.

Basic autogeosteering algorithms can be represented by Pearson correlation coefficient, mean square root deviation, repeated section, self-correlation, and other algorithms. Several algorithms can be combined (summarized, multiplied, e.t.c.).

Both of these algorithms calculate the similarity between synthetic log (204) calculated from the typewell and actual horizontal well log data (205). It can be calculated using Pearson correlation coefficient or mean square root deviation. The resulting numbers are provided as algorithms outputs.

Figure 4:
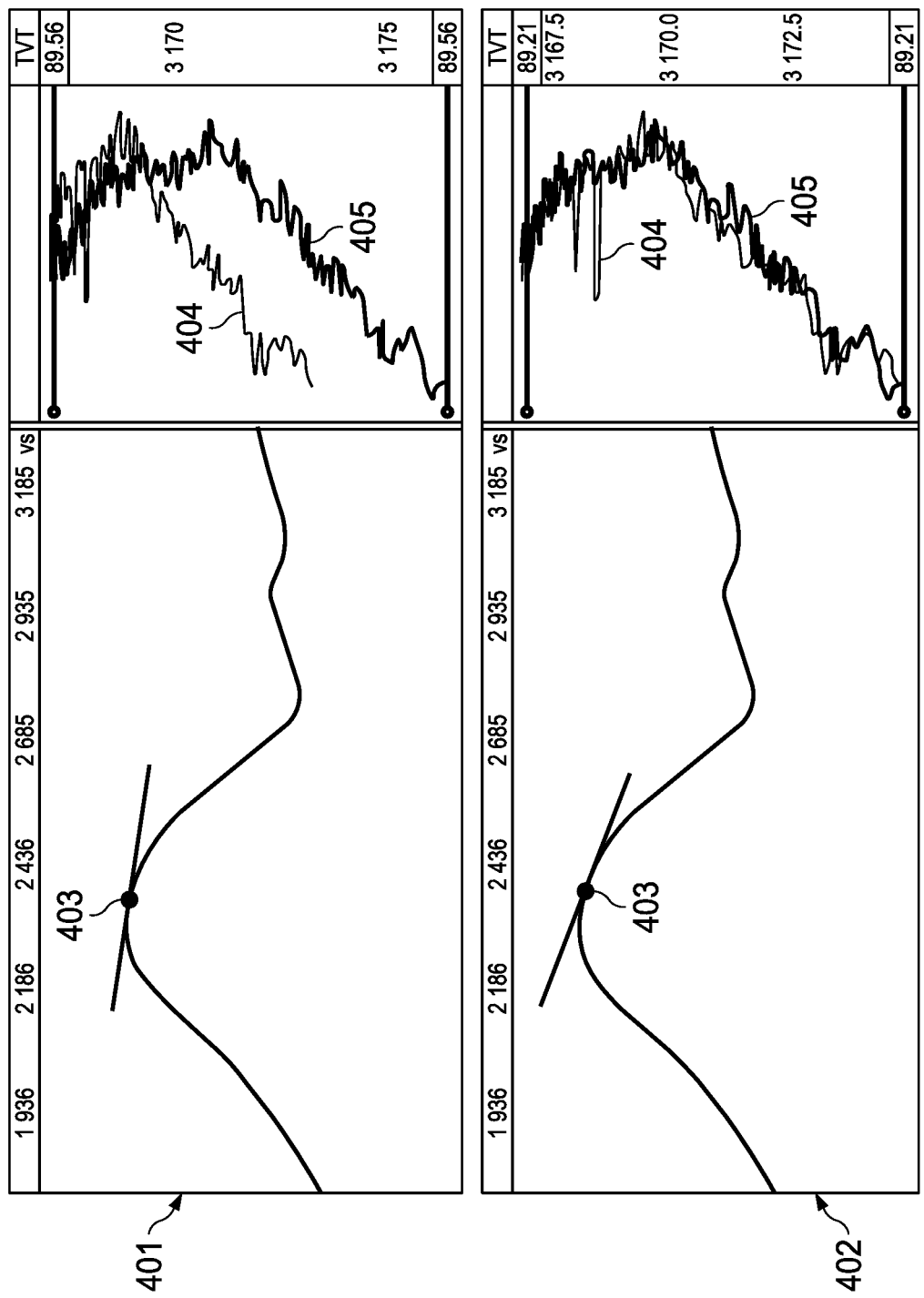
FIG. 4 shows a repeated section method for assisted and automated geosteering.

As shown in FIG. 4, this algorithm identifies formation dips in the sections of the wellbore with substantial inclination changes (well bending sections). (401) shows the initial step of the process before the appropriate formation dip had been identified.

1) The calculation is performed for a given formation dip range.

2) For every selected formation dip, well bending sections (403) are identified. The horizontal well logs from the bending section are projected on the TVT (true vertical thickness) axis using current formation dip (404 and 405). True vertical thickness could be understood as the thickness of a bed or rock body measured vertically at a point. The values of true vertical thickness in an area can be plotted and contours drawn to create an isochore map. Since the well is bending in this section well log in TVT scale will overlap on itself. The mean square root difference function is calculated between the overlapping pieces of the log.

3) Repeat this operation for all dip values within the dip range.

4) Formation dip with minimal mean square root difference function (402) is considered as a true formation dip for this section given that the function is below the certain cutoff.

Figure 5:
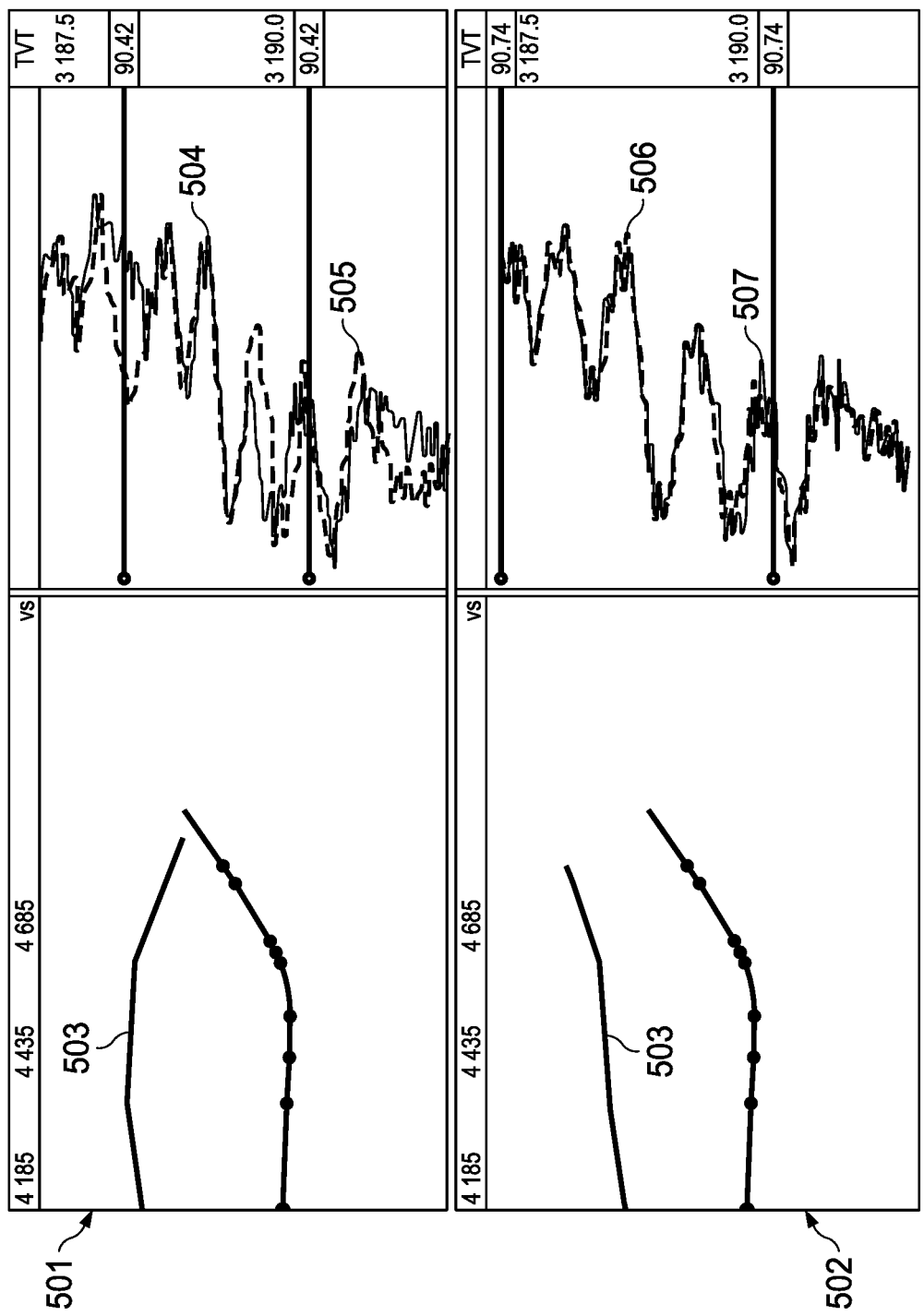
FIG. 5 shows a self-correlation method for assisted and automated geosteering.

In the algorithm shown in FIG. 5, self-correlation basic algorithm can be run if multiple MD (Measured depth, which is determined by the length of the wellbore) log values have the same or similar TVT values (504 and 505). In other words, if the well intersects the same geological formation 2 or more times.

Self-correlation dataset is built as a multiple MD points with the same or similar TVT values. The algorithm in this example outputs a correlation coefficient that is calculated as value opposite to the mean square root difference of log values for every given TVT value.

The TVT values (504 and 505) corresponds to the case where the output correlation coefficient will be low and (506 and 507) corresponds to the high correlation coefficient.

Figure 6:
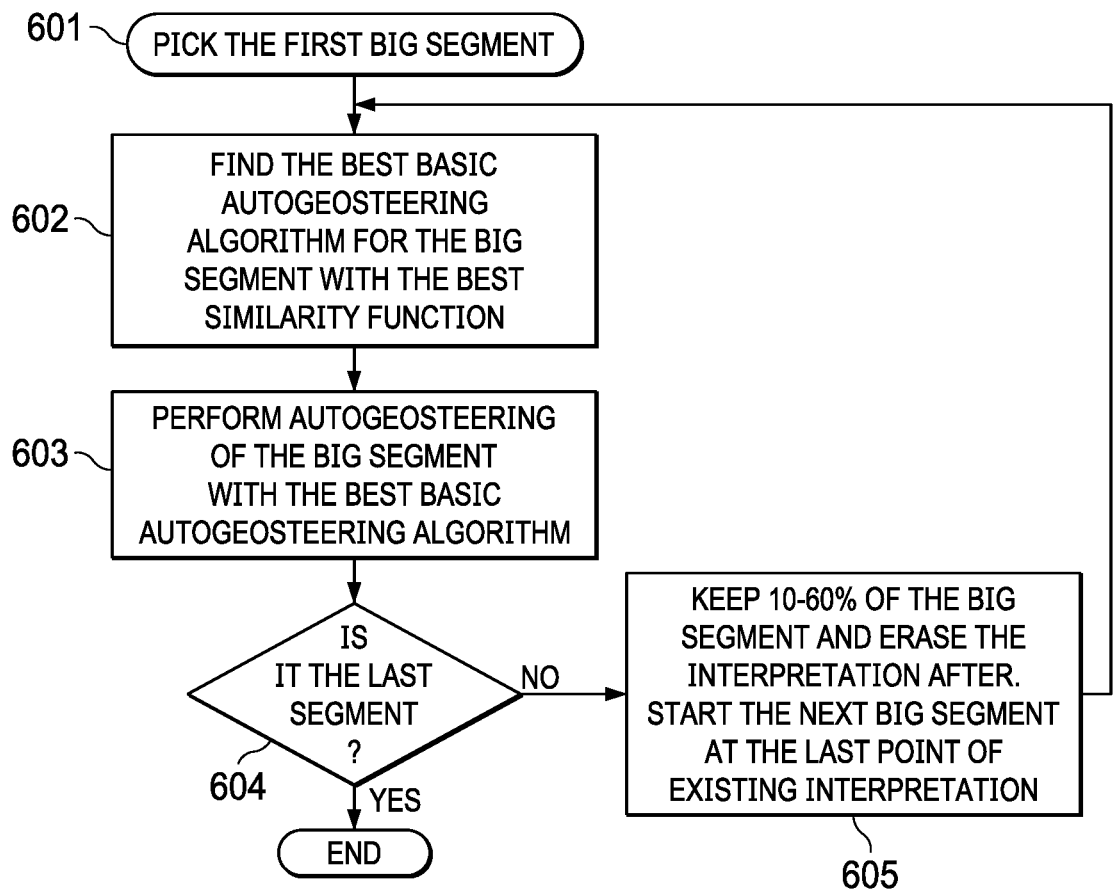
FIG. 6 shows an assisted and automated geosteering confidence factor.

Best basic algorithm selection workflow is displayed on FIG. 6. At the first step (601), the best basic autogeosteering algorithm is selected for the big segment. It can be selected (602), as the algorithm with maximum similarity functions between the synthetic log and horizontal log. Then the whole big segment is geosteered using the best algorithm (603). Then 10-60% of the resulting geosteering interpretation that belong to the deeper part of the big segment is erased and the next big segment starts at the point from which the data had been erased (605). The next big segment goes through the same procedure until the end of the lateral is reached (604). As a result, the whole lateral is geosteered and each big segment may be geosteered with different basic geosteering algorithms.

Figure 7:
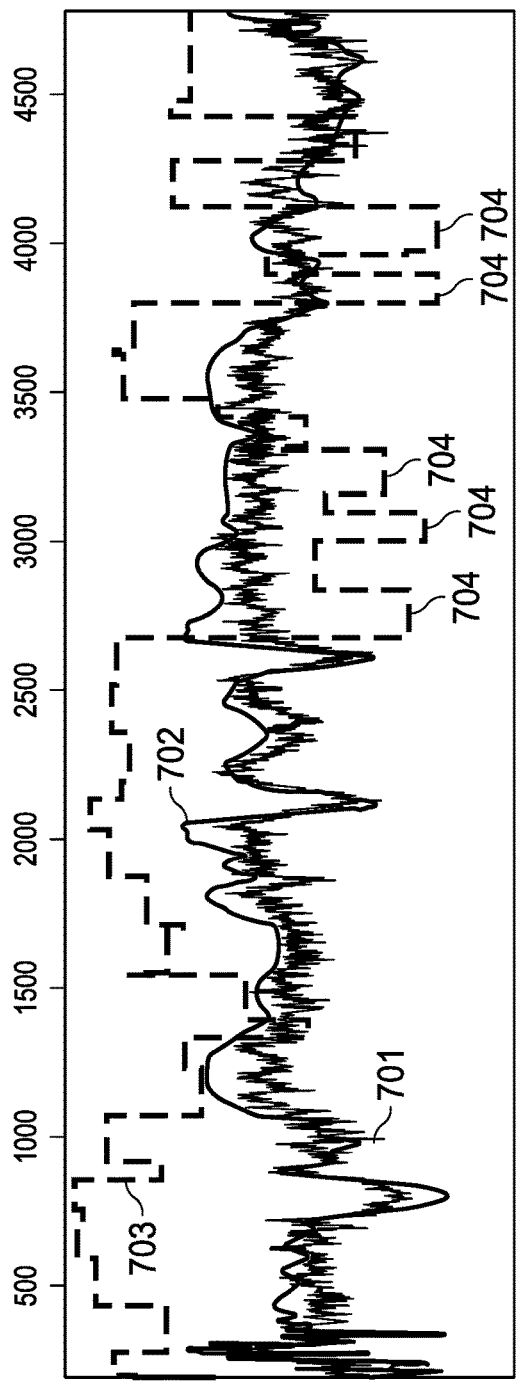
FIG. 7 shows a geosteering spectrum.
Figure 7:
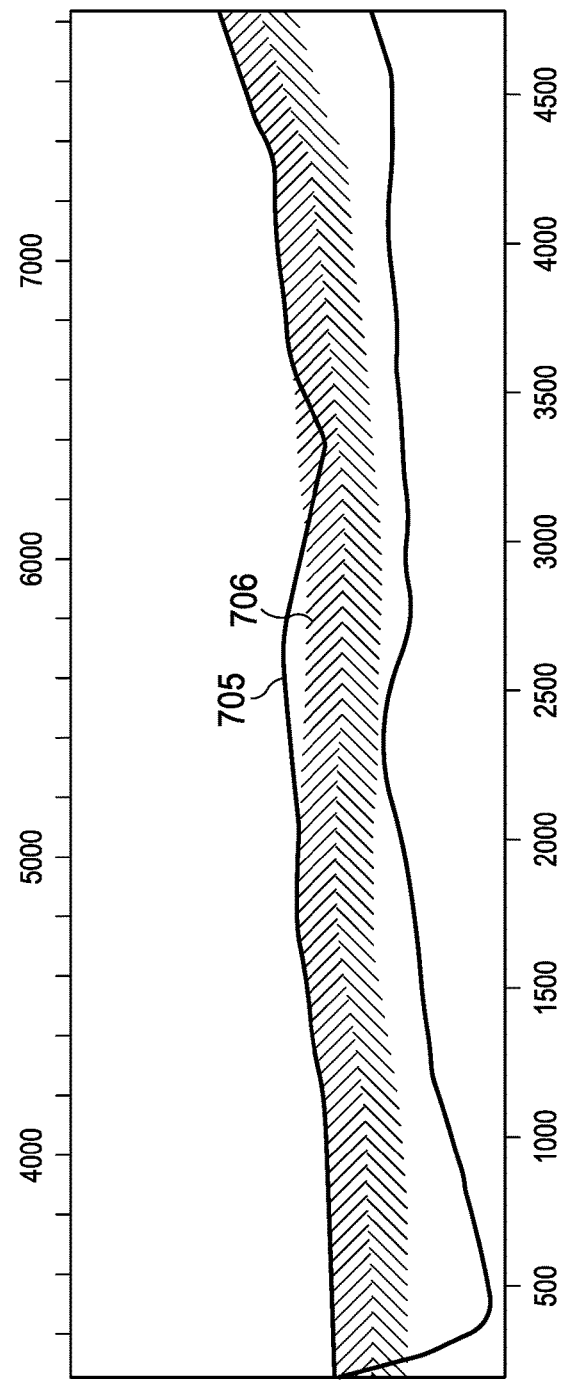

As shown in FIG. 7, a confidence factor can be calculated for each segment that is interpreted using various automated and assisted geosteering approaches (703). It can be calculated using Pearson or any other similarity function. On parts of the well where confidence factor between a horizontal well log (701) and a synthetic well log (702) is low, there is a chance that the automated algorithm made a mistake and autogeosteering interpretation (705) will be different from the actual geology (706). Geologist can manually check the confidence factor values and come up with a manual interpretation in the areas with low confidence (704).

Figure 8:
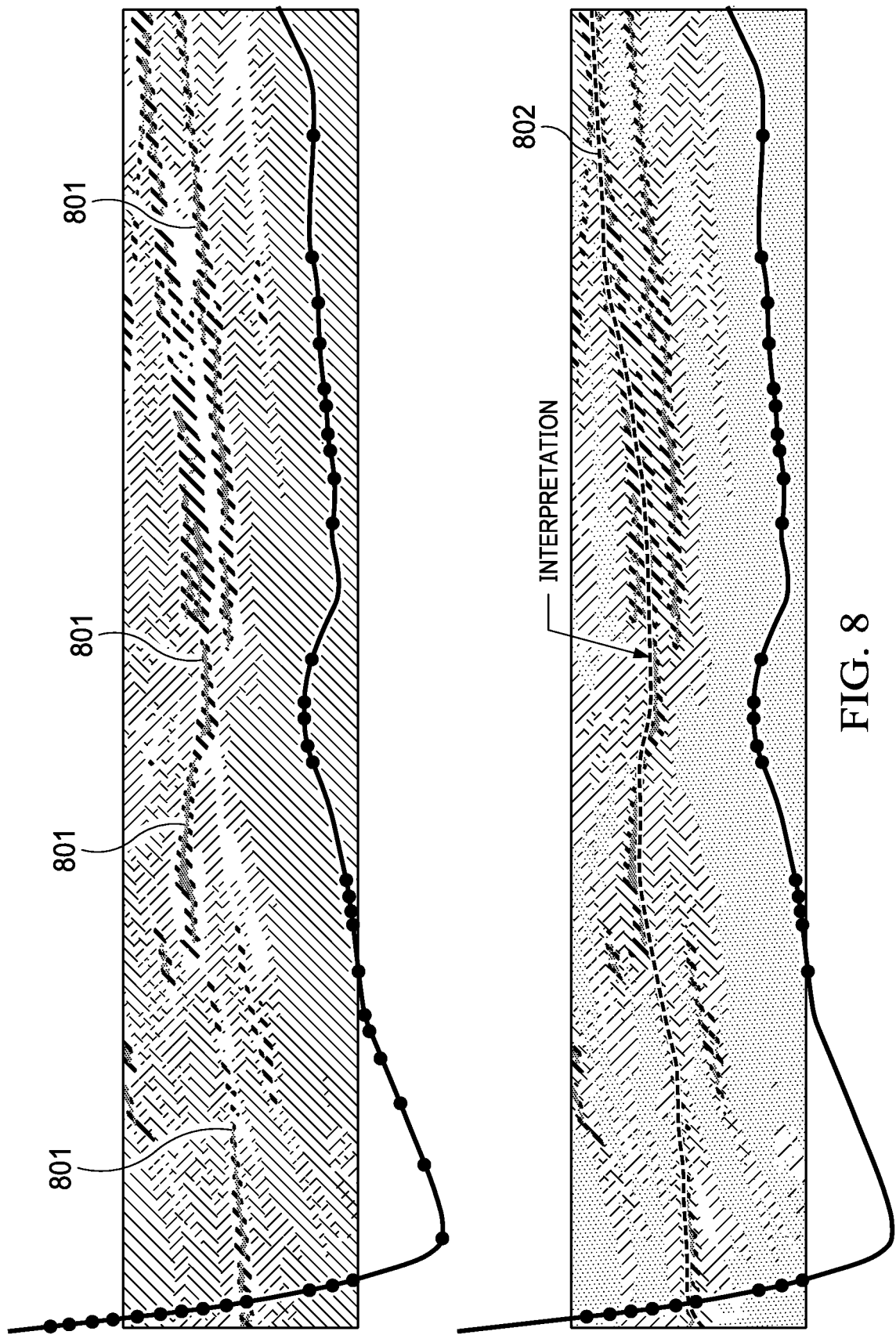
FIG. 8 shows a real-time implementation of automated and assisted geosteering.

Geosteering spectrum is an interpretation technique for geosteering interpretation scenarios as shown in FIG. 8. Typewell log and lateral well log Pearson correlation coefficient, mean square root deviation, and sum of absolute differences or any other similarity function can be calculated for each point of the lateral well log with certain steps for certain depth ranges (e.g., each depth may correspond to a certain position on the typewell) for each formation dip within formation dip range. Combined similarity function value is calculated from the calculation results from the previous step. Combined similarity function value is normalized for each MD and plotted on the cross-section with variable colors to depict high values.

The resulting image allows for the geologist to quickly evaluate the most likely position of the geosteering horizon (801).

Geosteering spectrum can also be used to come up with assisted and automated geosteering results. The algorithm may use the geosteering spectrum as a guidance to come up with the interpretation that goes through the highest values of a combined similarity function while honoring the geological constraints on regional formation dip, formation dip ranges, and formation dip variability from segment to segment (802).

Figure 9:
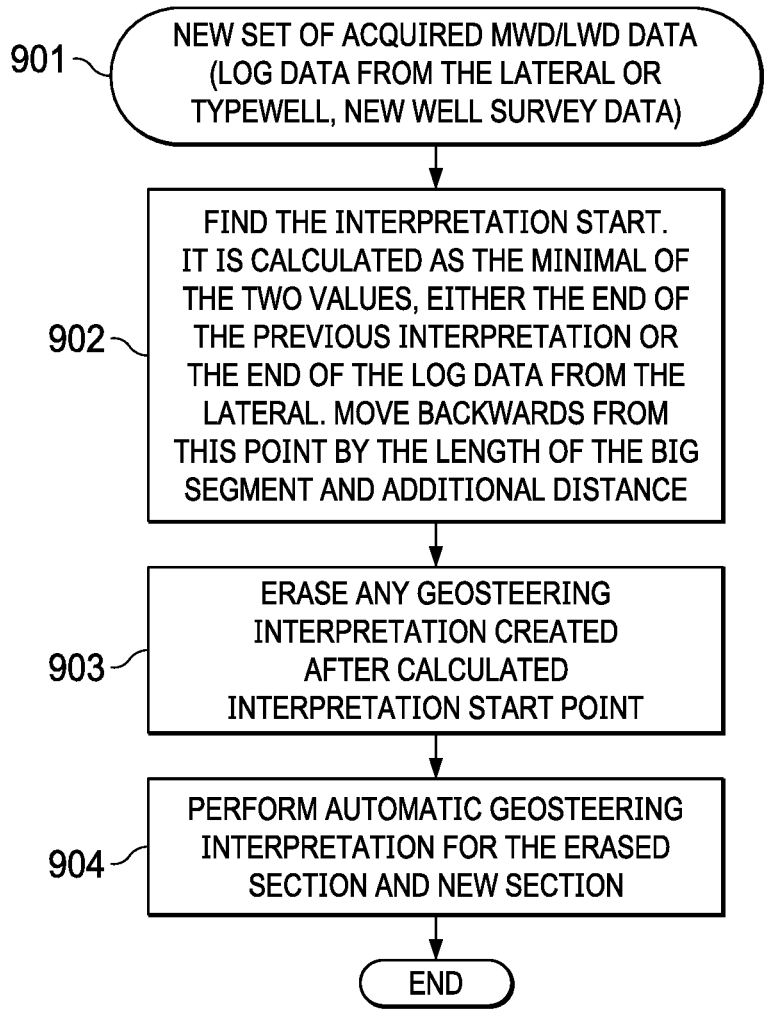
FIG. 9 shows a sample automatic geosteering workflow.

Automated or assisted geosteering can be conducted while drilling or after the well was drilled as shown in FIG. 9. If it being conducted while drilling then when the new set of MWD/LWD data is received (e.g., through data import or WITSML) the algorithm steps back by certain MD step and re-geosteer the last portion of the lateral that includes new data as well as some part of the old data.

Still referring to FIG. 9, the workflow can be started once the partial or full data for the vertical section of the well are received (901). Then the interpretation start is found (902) by calculating the minimal of the two values, either the end of the previous interpretation or the end of the log data from the lateral. The interpretation is formed by moving backwards from this point by the length of the big segment distance and any additional distance. The geosteering interpretation created after the calculated interpretation start point is then erased (903). Automatic geosteering interpretation for the erased section and the new section is then performed (904). Log data can be normalized to synchronize lateral well and typewell log scales. Machine learning algorithm can be used to automatically geosteer the vertical portion of the horizontal well.

Once the well reached horizontal portion big segment analysis can be implemented. Big segment analysis consists of looking forward algorithm and iterative search for the biggest K value. Once the algorithm finds the gest geosteering solution with the biggest K, the big segment analysis can be repeated starting from 10-60% length of the initial big segment. As soon as the last segment is processed through big segment analysis, the whole lateral can be automatically geosteered using big segment analysis to come up with biggest K value for the entire lateral.

Target line and/or well plan change recommendations can be provided as a result of this process. The recommendations may be provided in a way to direct the drilling into the target zone in case if the lateral exited the target zone, or alternatively it may be recommended to stay in the target zone if resulting interpretation indicates that the lateral is currently is in the target formation.

After the recommendations are provided the well drilling continues. The new survey, log or drilling data may come through las files or WITSML data. Once the new data is received, big segment analysis can be repeated starting from the MD point of the lateral before the last MD value. It may be the first point of the lateral or certain distance from the last MD. Once automatic geosteering interpretation is done Target line and/or well plan change recommendations may be provided.

Drilling data such as ROP (Rate of Penetration), MSE (Mechanic Specific Energy) or any other drilling parameters recorded at the surface or at the drilling bit can be used to constrain assisted or automatic geosteering interpretation or to perform geosteering interpretation for the whole or for the part of the lateral.

A sample workflow of automatic geosteering with the drilling data includes building a predictive model that can predict Gamma or any other well log information from drilling data. The model can be built using an existing dataset from the current or neighboring wells. The model can be as simple as linear regression or as complex as a neural network. Once the model is built or trained it can be tested and verified using the existing dataset.

The predictive model can provide Gamma or any other log predictions ahead of the log tool in the blind zone between the drilling bit, a Gamma tool, or any other log tool. This predicted log can be used as an additional input for automated geosteering. Additionally, surface or downhole drilling logs can be used as inputs for the geosteering together with regular well logs.

Figure 10:
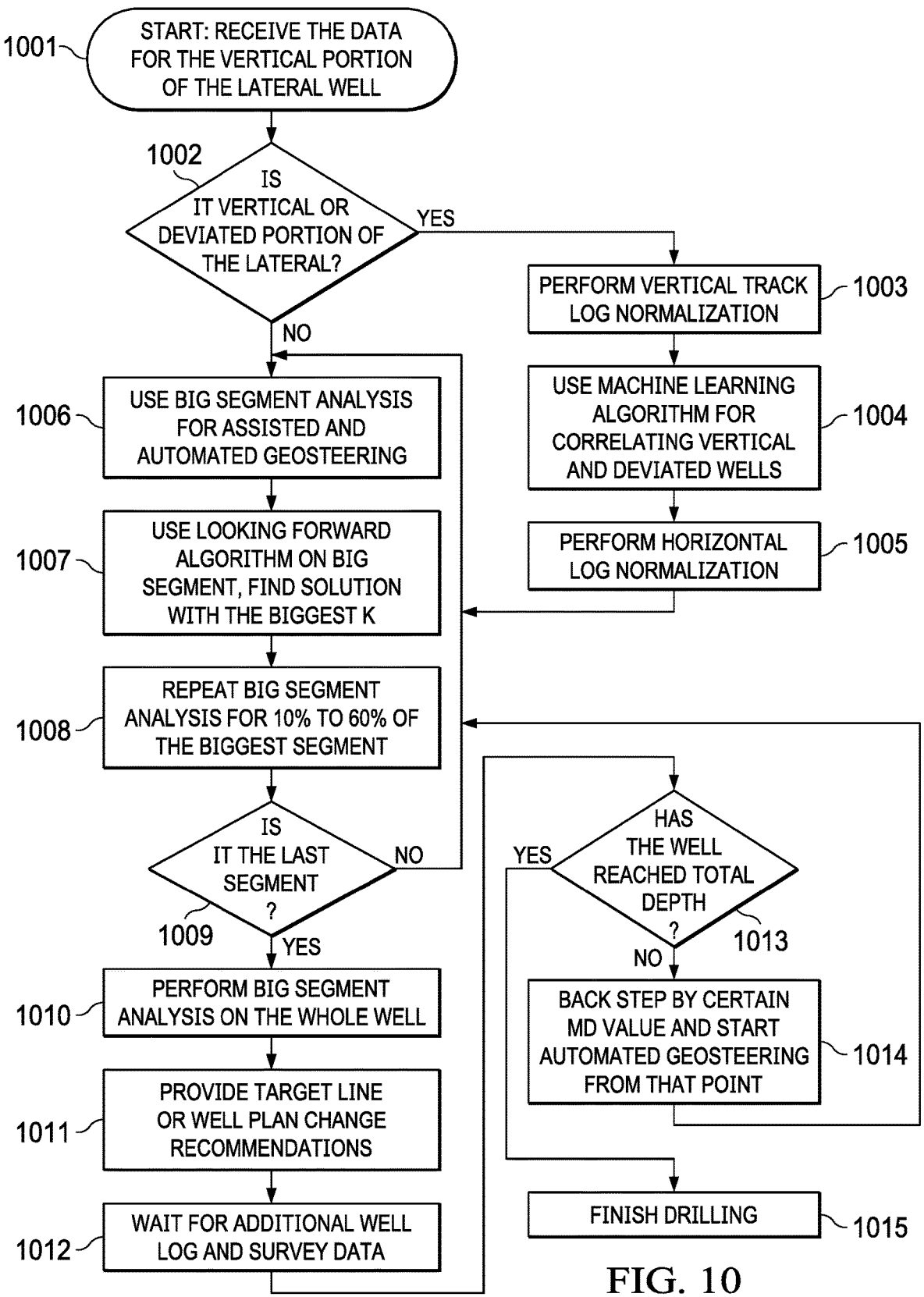
FIG. 10 shows an example system which may used to perform various aspects of the disclosed systems and methods

FIG. 10 describes an example embodiment of the method for geosteering a horizontal well. The computer will first receive the data for the vertical portion of the well, (1001). The computer will determine if the well is vertical or a deviated portion of the lateral, (1002). If the well is vertical then the computer will perform a vertical track log normalization, (1003) then use a machine learning algorithm for correlating vertical and deviated wells, (1004) and then perform a horizontal log normalization, (1005), after which the computer will then return to using the big segment analysis, (1006). If the well is determined at (1002) to be deviated, the computer will use big segment analysis for assisted and automated geosteering, (1006). The computer will use a looking forward algorithm on the current big segment and find the solution with the biggest K value, (1007). The computer will repeat the big segment analysis for 10-60% of the biggest segment. If the computer determines at (1009) that the current segment is not the last segment then it will return to step (1006) for the next big segment analysis. If the computer determines at (1009) that the current segment is the last segment then it will perform a big segment analysis on the whole well (1010). The computer will then provide a target line or well plan change recommendations (1011). The computer will then wait for additional well log and survey data to update the analysis (1012). If the computer determines (1013), that the well has not reached its total target depth then the computer will back step by a predetermined MD value and start automated geosteering from that point (1014), after which the computer will return to step (1006). If the computer determines (1013), that the well has reached its total target depth then it will finish drilling at (1015).

The disclosed example embodiments may be implemented by a computer system which may be used to perform various aspects of the methods and systems disclosed above. A processor may perform calculations on values stored in a local cache, mass storage device, storage device, or memory. Commands may be output to an output device or a communications interface and commands may be received through an input device or the communications interface. Signals, commands, queries, and the like may be exchanged between components of the example computer system over a bus. In some examples, the methods disclosed above can be saved in memory as executable files (e.g., binaries and the like) which may be operated and performed by the processor and/or over the communications interface. The computer system may communicate with a steerable drilling bit through various methods including mud pulses.

Although the invention has been described in terms of embodiments which are set forth in detail, it should be understood that this is by illustration only and that the invention is not necessarily limited thereto. For example, terms such as upper and lower or top and bottom can be substituted with uphole and downhole, respectfully. Top and bottom could be left and right, respectively. Uphole and downhole could be shown in figures as left and right, respectively, or top and bottom, respectively. Generally downhole tools initially enter the borehole in a vertical orientation, but since some boreholes end up horizontal, the orientation of the tool may change. In that case downhole, lower, or bottom is generally a component in the tool string that enters the borehole before a component referred to as uphole, upper, or top, relatively speaking. Terms like wellbore, borehole, well, bore, oil well, and other alternatives may be used synonymously. Terms like tool string, tool, perforating gun string, gun string, or downhole tools, and other alternatives may be used synonymously. The alternative embodiments and operating techniques will become apparent to those of ordinary skill in the art in view of the present disclosure. Accordingly, modifications of the invention are contemplated which may be made without departing from the spirit of the claimed invention.

What is claimed is:

1. A method for geosteering a drill bit comprising:
   acquiring log data from at least one typewell;
   normalizing the log data from the at least one typewell for a well having a wellbore with a lateral section and a horizontal section;
   identifying a plurality of big segments within the horizontal section of the wellbore;
   comparing measured data with normalized data within each big segment from the at least one typewell using a plurality of algorithms and ranking the plurality of algorithms for similarity between the measured data and the normalized data;
   selecting the algorithm with the highest ranked similarity;
   drilling within the horizontal section of the wellbore;
   determining a geological formation the drill bit passes through using the comparison of the measured data with the normalized data; and
   adjusting a path of the drill bit to a desired geological formation, wherein the path adjustment includes geosteering within at least one big segment with the selected algorithm having the highest ranked similarity.

2. The method of claim 1 further comprising selecting big segments that overlap.

3. The method of claim 2 further comprising comparing measured data with normalized data from the at least one typewell and determining a K-value for each of the plurality of algorithms within the plurality of big segments, wherein the highest K-value corresponds to the highest similarity.

4. The method of claim 3 further comprising sending commands from the surface to the drill bit to adjust the path of the wellbore.

5. The method of claim 3 further comprising calculating the K-Value for the plurality of big segments.

6. The method of claim 5 further comprising incorporating drilling data in realtime to update the geosteering adjustments.

7. The method of claim 6, wherein the drilling data includes rate of penetration data.

8. The method of claim 6, wherein the drilling data includes mechanic specific energy data.

9. The method of claim 1 wherein the comparing of the measured data with the normalized data includes mean square deviation calculations.

10. The method of claim 1 wherein the comparing of the measured data with the normalized data includes Pearson correlation coefficient calculations.

11. The method of claim 1 wherein a plurality of typewells is used.

12. The method of claim 1, further comprising generating a geosteering spectrum, wherein the highest values of a combined similarity function are displayed.

13. A method for geosteering in a well comprising:
   acquiring log data from at least one vertical typewell;

determining from measured log data of a portion of the well if a drill bit is currently located in a vertical or a deviated portion of a lateral well;

creating a plurality of big segments of the well;

comparing at least one forward looking algorithm on a predetermined first big segment encompassing the drill bit's location in the well and finding a first correlation between each of the at least one forward looking algorithms with the typewell log data;

comparing at least one forward looking algorithm on a consequent big segment, adjacent to the first big segment, encompassing the drill bit's location in the well and finding a second correlation between each of the at least one forward looking algorithms with the typewell log data;

selecting a first algorithm based on the first correlation, wherein the selection is based on a similarity function;

selecting a second algorithm based on the second correlation, wherein the selection is based on the similarity function;

determining the location of the drill bit using the selected first algorithm and second algorithm; and adjusting the path of the drill bit, wherein the path adjustments include geosteering in a part of the consequent big segment using the selected second algorithm.

14. The method of claim 13 further comprising performing a big segment analysis on the whole well.

15. The method of claim 13 further comprising generating a target line for the drill bit to follow.

16. The method of claim 13 further comprising generating one or more well plan change recommendations based on the drill bit location information.

17. The method of claim 13 further comprising acquiring additional well log data and updating the selecting of the first algorithm and the second algorithm.

18. The method of claim 13 wherein the comparing of the measured data with the typewell data includes mean square deviation calculations.

19. The method of claim 13 wherein the comparing of the measured data with the typewell data includes Pearson correlation coefficient calculations.

20. The method of claim 13 further comprising incorporating drilling data in realtime to update geosteering interpretation.

21. The method of claim 20, wherein the drilling data includes rate of penetration data.

22. The method of claim 20, wherein the drilling data includes mechanic specific energy data.

23. The method of claim 13, further comprising generating a geosteering spectrum, wherein the highest values of a combined similarity function are displayed.

* * * * *